(No Model.)  2 Sheets—Sheet 1.
J. H. ROGERS.
VEHICLE BRAKE.
No. 596,911. Patented Jan. 4, 1898.
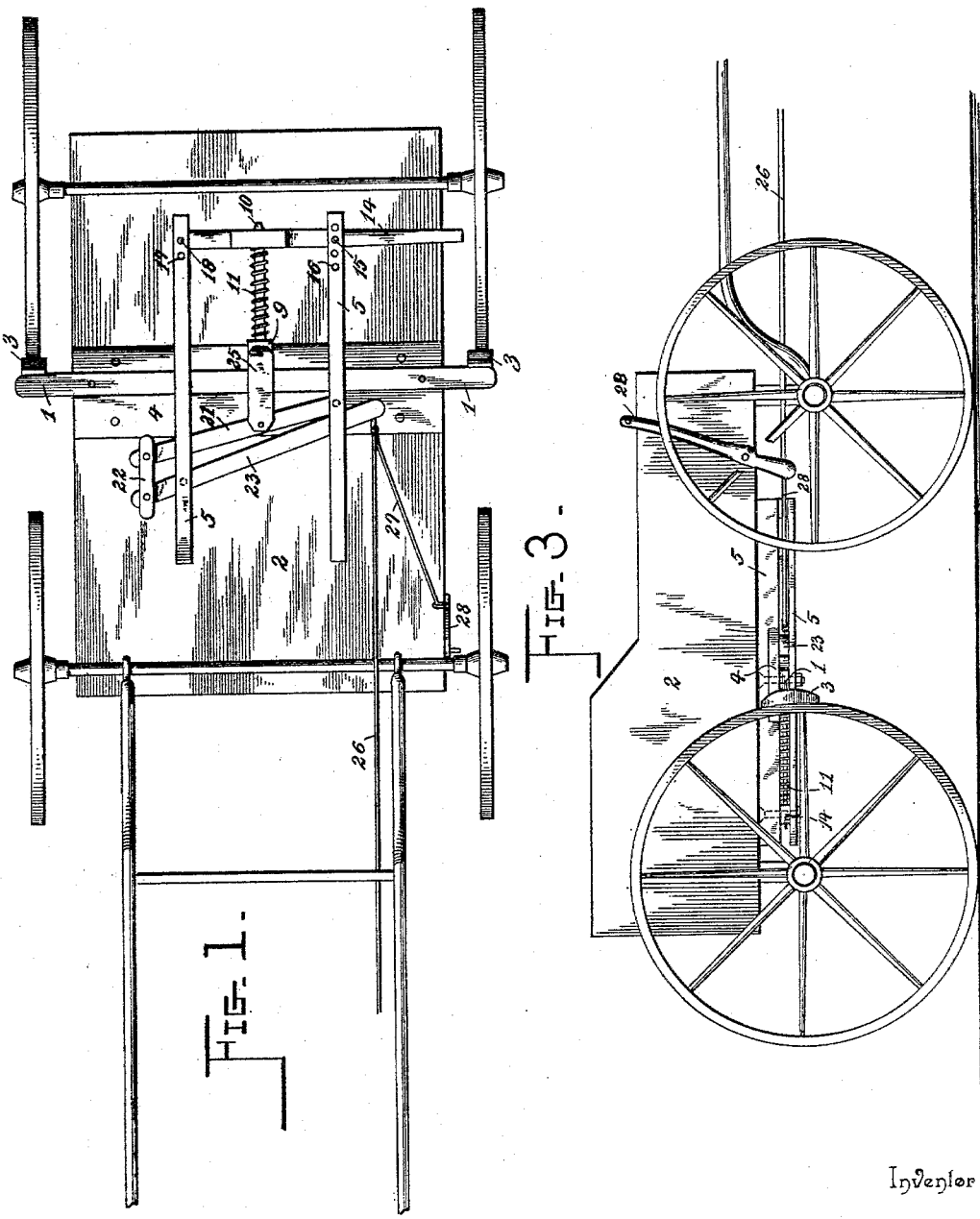
Witnesses  Inventor
 John H. Rogers.
By his Attorneys, (No Model.) 2 Sheets—Sheet 2.
J. H. ROGERS.
VEHICLE BRAKE.
No. 596,911. Patented Jan. 4, 1898.
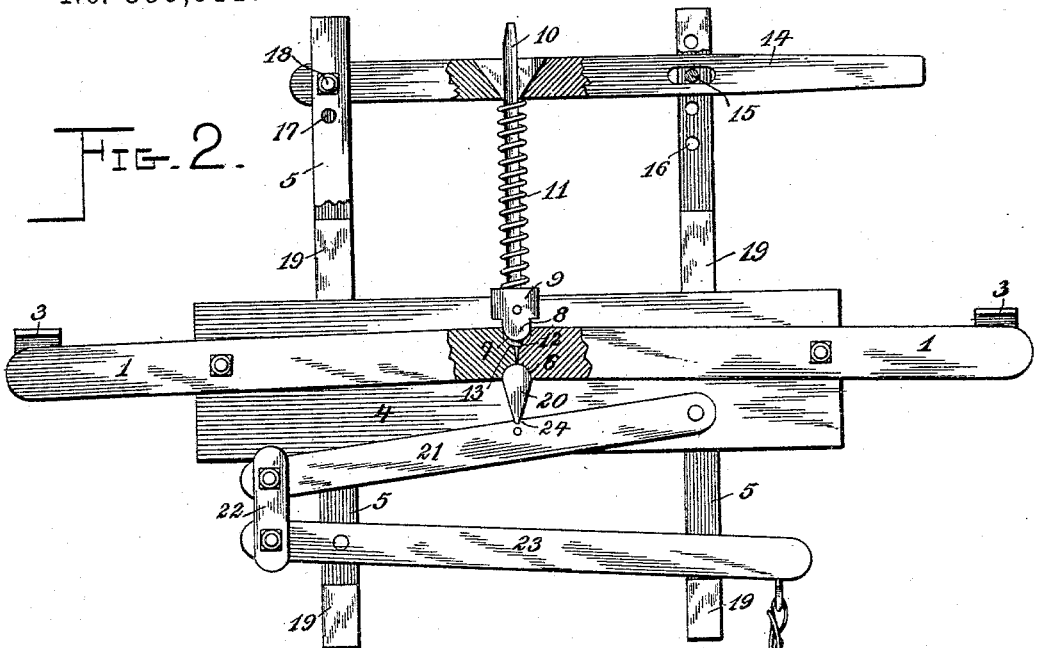
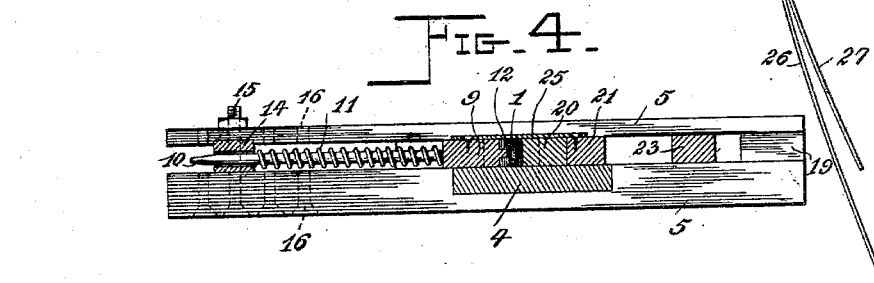
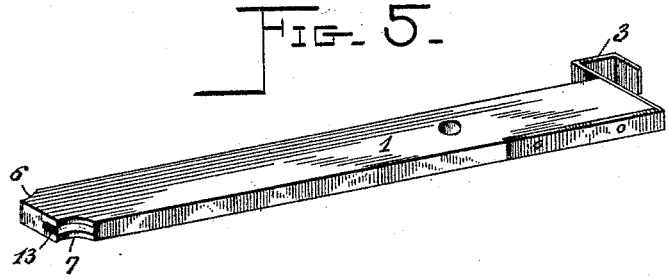
Witnesses  
John F. Sinkwiel  
N. F. Riley
Inventor  
John H. Rogers.
By his Attorneys,  
C. A. Snow & Co.

UNITED STATES PATENT OFFICE.

JOHN H. ROGERS, OF MOOREFIELD, WEST VIRGINIA.

VEHICLE-BRAKE.

SPECIFICATION forming part of Letters Patent No. 596,911, dated January 4, 1898.

Application filed May 29, 1897. Serial No. 638,773. (No model.)

*To all whom it may concern:*

Be it known that I, JOHN H. ROGERS, a citizen of the United States, residing at Moorefield, in the county of Hardy and State of West Virginia, have invented a new and useful Vehicle-Brake, of which the following is a specification.

The invention relates to improvements in vehicle-brakes.

The object of the present invention is to improve the construction of automatic vehicle-brakes and to provide a simple, inexpensive, and efficient one capable of use in connection with a one-horse vehicle and adapted to be automatically applied when the vehicle moves forward on the horse in descending a hill and to be readily released when there is a draft strain.

A further object of the invention is to enable the automatic brake to be readily held off the wheels in backing the vehicle and to provide simple and efficient means for regulating the pressure exerted by the brake-shoes on the wheels.

The invention consists in the construction and novel combination and arrangement of parts, as hereinafter fully described, illustrated in the accompanying drawings, and pointed out in the claims hereto appended.

In the drawings, Figure 1 is a reverse plan view of a vehicle provided with an automatic brake constructed in accordance with this invention. Fig. 2 is a reverse plan view, partly in section, illustrating the construction of the brake mechanism and showing the arrangement of the parts when the brake is not applied. Fig. 3 is a side elevation illustrating the arrangement of the operating mechanism. Fig. 4 is a detail sectional view taken longitudinally of the brake mechanism. Fig. 5 is a detail perspective view illustrating a modification of the brake-levers.

Like numerals of reference designate corresponding parts in the several figures of the drawings.

1 1 designate a pair of transversely-disposed brake-levers fulcrumed between their ends on a vehicle 2 and provided at their outer ends with brake-shoes 3 for engaging the hind wheels. The brake-levers, which may be fulcrumed directly on the vehicle or on a transverse bar 4, have their inner ends arranged in suitable longitudinal ways or guides 5 and are notched at the front and rear at 6 and 7 to form substantially semicircular recesses. The rear recess 7 receives a substantially semicircular projection 8 of a head 9 of a stem or rod 10, which supports a spiral spring 11, and the latter, when free to act, presses the inner ends of the levers 1 forward and causes their outer ends to engage the hind wheels. The segmental projection 8 is provided with a curved flange 12, which fits in a corresponding groove 13 of the inner ends of the brake-levers, whereby the spring-actuated head 9 is interlocked with the same.

The spiral spring 11 is interposed between the head 9 and an adjustable lever 14, which is fulcrumed at one end and which is provided between its ends with a perforation to receive the rod or stem 10. The other end of the adjustable lever forms a handle and the adjacent portion is secured by a bolt 15, which passes through an opening of the lever 14 and through any one of a series of perforations 16 of one of the guides or keepers 5. The other guide or keeper is provided with perforations 17, adapted to receive the fulcrum-bolt 18, in order to permit a further adjustment of the lever 14. The adjustment of the lever 14 regulates the tension of the spring 11 and enables the pressure of the brake-shoes to be varied to suit the size and kind of vehicle to which the brake is applied.

The guides or keepers 5 are composed of parallel upper and lower bars spaced by blocks 19, and the upper bars are recessed to receive the transverse bar 4 when the latter is used and constitute with the same a supporting-frame.

The front recess 6 receives the rear end of a block 20, which is interposed between the inner ends of the levers 1 and a transverse lever 21, and the latter is connected by a link 22 with an operating-lever 23. The block 20 has its rear end rounded to conform to the configuration of the recess 6, and its front end is pointed and fits in a notch 24 of the rear edge of the transverse lever 21, the block being slightly tapering throughout its entire length, as clearly shown in Fig. 2 of the accompanying drawings. The head 9 and the transverse lever 21 are connected by a plate 25, disposed longitudinally of the vehicle and retaining the block 20 in position.

When the lever 23, which is fulcrumed between its ends, is drawn forward by means hereinafter described, the transverse lever 21 is forced rearward, causing the inner ends of the brake-levers to be carried rearward and relieving the wheels of the brake-shoes.

The outer or free end of the lever 23 is connected by a strap 26 with a part of the harness of the horse or with the whiffletree, so that the lever 23 will be drawn forward when there is a draft strain exerted by the horse; but when the vehicle moves forward on the draft-animal in descending a hill the connection 26 will be slackened and will permit the spring 11 to force the brake-shoes into engagement with the wheels of the vehicle, thereby checking the forward movement of the latter. The slightest forward movement of the draft-animal will relieve the vehicle of the brake, so that the draft-animal does not draw the vehicle against the action of the brake.

The strap 26 is provided with an extension or branch 27, which is connected with a hand-lever 28 in order that the brake may be held out of operation when the vehicle is being backed. The hand-lever, which is fulcrumed between its ends, may be arranged in any suitable manner and is designed to be disposed so that it will be out of the way when it is not in use.

If desired or found necessary, the brake-levers may be constructed as shown in Fig. 5 of the drawings and have the brake-shoe mounted on the extreme end and forwardly offset in order to locate the brake mechanism a sufficient distance from the front wheels to prevent the same from contacting with them in cramping or turning a vehicle.

It will be seen that the brake is simple and comparatively inexpensive in construction, that it is positive, reliable, and automatic in operation, and that it is specially adapted for one-horse vehicles.

It will also be apparent that the levers 21 and 23 may be readily reversed to bring the hand-lever at either side of the vehicle.

What I claim is—

1. In an automatic vehicle-brake, the combination with a one-horse vehicle, of a pair of spring-actuated brake-levers arranged to engage the hind wheels, a transverse lever connected with the inner portions of the brake-levers and adapted to move the same rearward, connections between the transverse lever and the harness, and a hand-lever connected with the transverse lever, substantially as described.

2. In a vehicle-brake, the combination of a pair of brake-levers fulcrumed between their ends and provided with brake-shoes, a rod or stem engaging the inner ends of the brake-levers and extending rearward therefrom, a spiral spring disposed on the rod or stem and engaging the same, and an adjustable lever provided with an opening receiving the rear portion of the rod or stem and supporting the same, said adjustable lever being adapted to be moved forward or rearward for regulating the tension of the spring, substantially as described.

3. In a vehicle-brake, the combination of a pair of transverse brake-levers carrying brake-shoes, a spring-actuated rod or stem engaging the inner ends of the brake-levers at the rear edges thereof, the transverse lever 21 fulcrumed at one end, a block interposed between the lever 21 and the inner ends of the brake-levers, and the transversely-disposed lever 23 connected with the lever 21 and designed to be connected with the draft-animal, substantially as described.

4. In a vehicle-brake, the combination of a pair of transversely-disposed brake-levers provided at their inner ends with curved notches forming front and rear recesses, the rear edges of the brake-levers being provided with a groove, a longitudinal spring-actuated rod provided with a head having a segmental projection fitting in the rear recess, said projection being provided with a curved flange interlocking with said groove, the transverse lever 21 provided at its rear edge with a notch, the tapering block interposed between the brake-levers and the lever 21 and having its rear end rounded to fit the front recess and its front end pointed to engage the notch, and means for operating the lever 21 and for retaining the block in place, substantially as described.

5. In a vehicle-brake, the combination of the parallel longitudinal guides composed of upper and lower bars, and spacing-blocks, the upper bars being recessed, a transverse bar arranged in the recess, transverse brake-levers fulcrumed on the transverse bar and having their inner portions arranged in said guides, the transverse levers 21 and 23 connected at one side, a block interposed between the lever 21 and the brake-levers, a rod engaging the rear edges of the brake-levers, a spring disposed on the rod, and an adjustable lever mounted in said guides and engaging the spring, substantially as described.

6. In an automatic vehicle-brake, the combination with a one-horse vehicle, of a brake lever or bar carrying a brake-shoe, a spring for forcing the brake-shoe against the wheel, the transverse lever 21 fulcrumed at one end on the vehicle and connected between its ends with the brake bar or lever, and the transversely-disposed lever 23 fulcrumed between its ends, connected at one end with the lever 21 and designed to be connected with the draft-animal, substantially as described.

In testimony that I claim the foregoing as my own I have hereto affixed my signature in the presence of two witnesses.

JOHN H. ROGERS.

Witnesses:
J. V. WILLIAMS,
C. S. PORTER.